April 9, 1968 F. J. SAMERDYKE ET AL 3,377,087
UNION FOR CONNECTING CONDUITS
Filed May 5, 1965 2 Sheets-Sheet 1
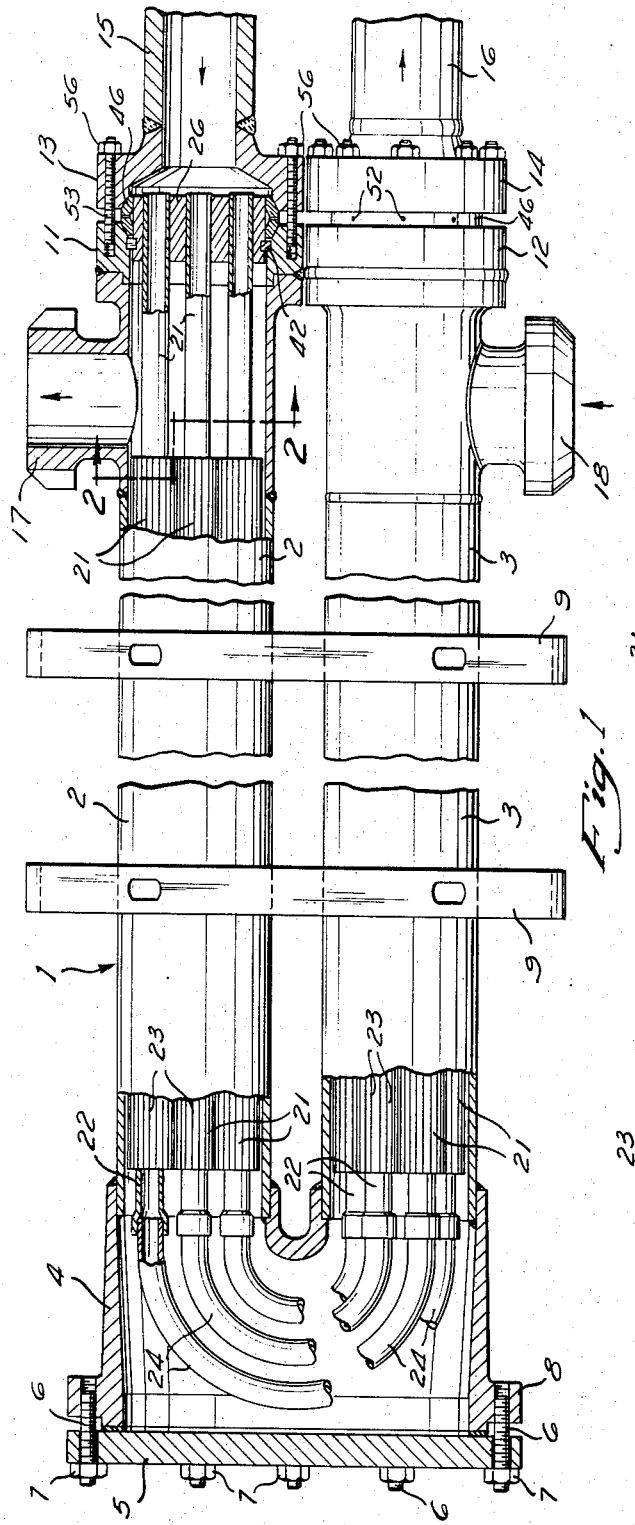
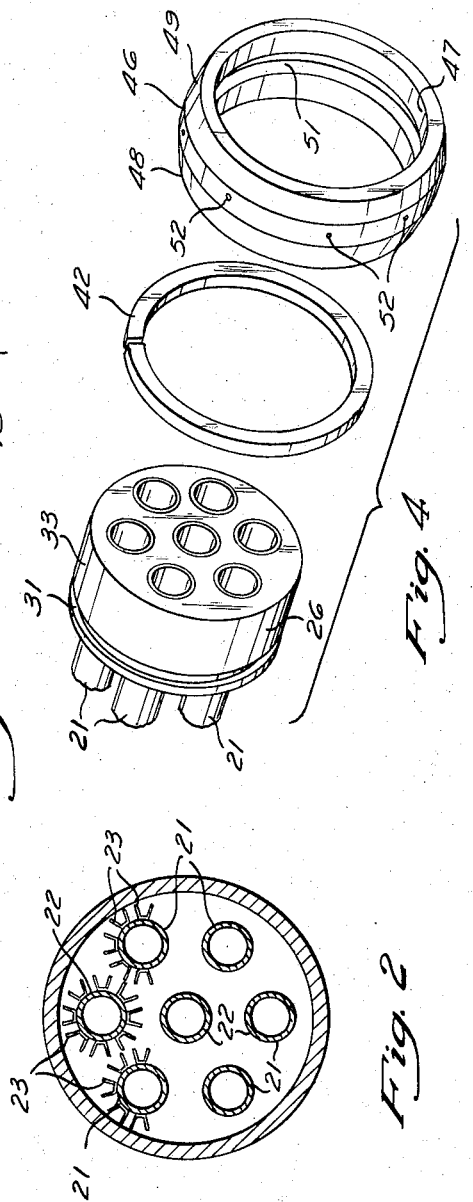
INVENTORS
FRED. J. SAMERDYKE,
& WILLIAM C. SESSIONS
BY
Bosworth, Sessions,
Herrstrom & Knowles
ATTORNEYS April 9, 1968   F. J. SAMERDYKE ET AL   3,377,087
UNION FOR CONNECTING CONDUITS
Filed May 5, 1965   2 Sheets-Sheet 2
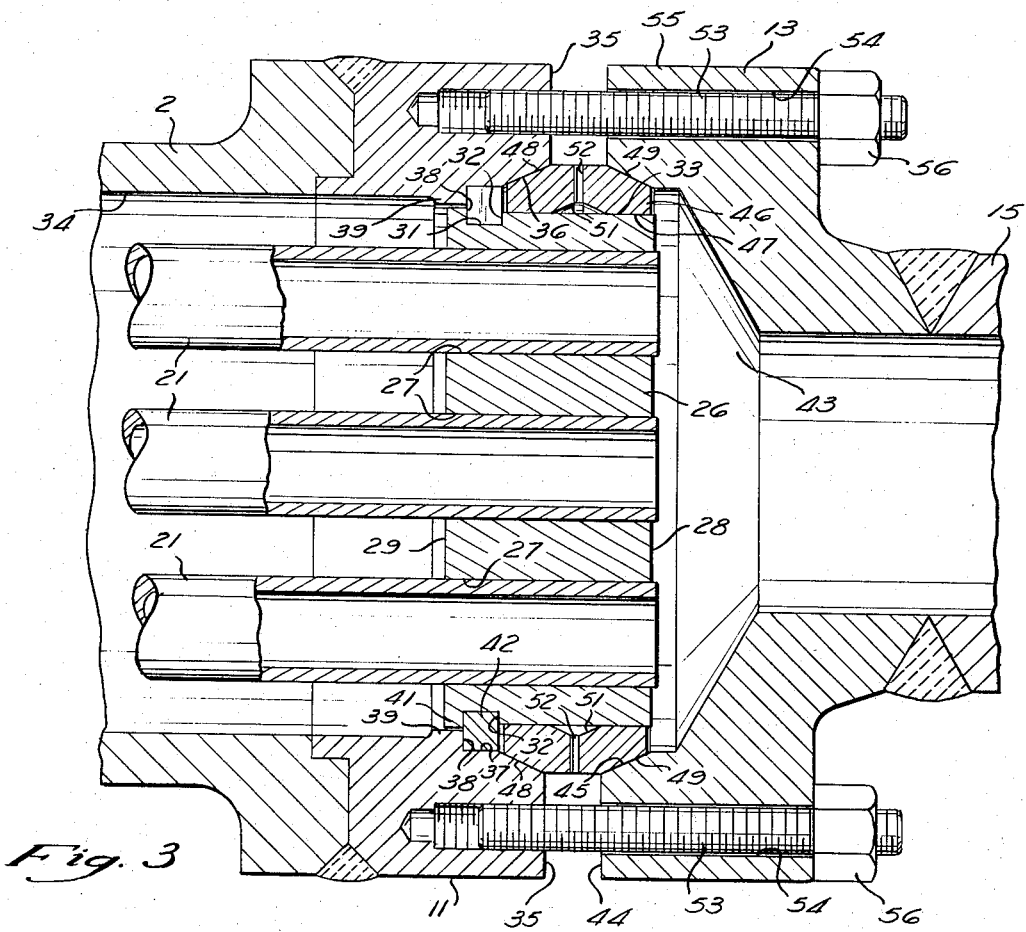
Fig. 3
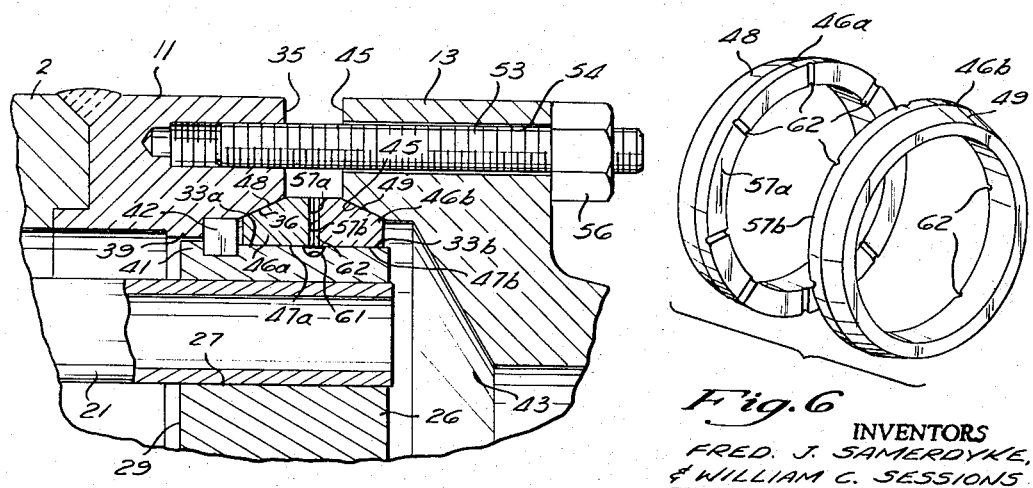
Fig. 5
Fig. 6
INVENTORS
FRED. J. SAMERDYKE,
& WILLIAM C. SESSIONS
BY
Bosworth, Sessions,
Herstrom & Knowles
ATTORNEYS United States Patent Office 3,377,087
Patented Apr. 9, 1968

3,377,087
UNION FOR CONNECTING CONDUITS
Fred J. Samerdyke, Rocky River, and William C. Sessions, Lakewood, Ohio, assignors to Brown Fintube Company, Elyria, Ohio, a corporation of Ohio
Filed May 5, 1965, Ser. No. 453,374
11 Claims. (Cl. 285—14)

ABSTRACT OF THE DISCLOSURE

A union for connecting at least three conduits of which the first conduit communicates with at least one second conduit and the third conduit surrounds and is spaced from the second conduit, which union is made up of a terminal member fixed to the third conduit, a fitting member fixed to the second conduit and a securing member fixed to the first conduit, the fitting member being prevented from moving axially of the securing member, there being internal sealing surfaces in the securing and terminal members and external cooperating sealing surfaces on the fitting member, and sealing ring means contacting all of the sealing surfaces and forced into sealing connection with the various members by wedging action of the securing and terminal members when they are drawn together.

---

This invention relates to unions for connecting conduits, and more particularly to unions for connecting three or more conduits.

A general object of the invention is to provide a simple and effective union for joining three conduits so that they provide two passages containing fluids that should not intermix, as is required in heat exchangers. Another object is the provision of such a union that can withstand high pressures without leakage. A further object is the provision of such a union that can be assembled and disassembled readily without requiring special tools or equipment and without applying any great or unusual forces to the union or to an assembly connected by such union; another object is to provide such a union that can be manufactured readily and at low cost. Other objects are the provision of a union for joining one or more inner tubes of a heat exchanger to an inlet or an outlet pipe and to the interior of a surrounding outer shell; and the provision of such a union that is particularly advantageous in hairpin type heat exchangers by making possible the ready assembly or disassembly of the hairpin inner tubes through the rear of the heat exchanger while permitting ready access, from the front of the exchanger, to the sealing surfaces of the union for assembly, inspection, cleaning or repair.

Further objects and advantages of the invention will become apparent from the following description of two forms thereof, reference being made to the accompanying drawings in which:

FIGURE 1 is a side elevation, with parts broken away, of a multiple tube heat exchanger of the hairpin type comprising one form of union embodying the invention;

FIGURE 2 is a section along line 2—2 of FIGURE 1 showing particularly the cross-sectional arrangement of the tubes relative to each other in one of the hairpin legs of the heat exchanger;

FIGURE 3 is an enlarged axial sectional view showing the union at one end of one of the shell tubes of the heat exchanger of FIGURE 1;

FIGURE 4 is an exploded perspective view to a scale of some of the parts making up the assembled union of FIGURE 3;

FIGURE 5 is an enlarged axial sectional view of a portion of one of the hairpin-shaped legs of a heat exchanger similar to that of FIGURES 1 and 2 but comprising another union embodying the invention; and FIGURE 6 shows in perspective the two sealing rings used in the embodiment of FIGURE 5.

As shown in FIGURES 1, 2 and 3 of the drawings, a preferred form of heat exchanger embodying the invention comprises a shell 1 made up of a pair of outer conduits or tubes 2 and 3 disposed one above the other with their axes substantially parallel. These are connected together at the rear ends to the front end of a return housing 4. Housing 4 is formed with an open rear end that is closed by a cover 5 secured by studs 6 and nuts 7 to a rear flange 8 of housing 4; the interiors of the housing 4 and shell tubes 2 and 3 are thus available for easy assembly or disassembly of the heat exchanger, and for inspection, cleaning or repair.

Shell tubes 2 and 3 may be supported by frame members 9 or any other convenient means. The forward end portions of the shell tubes 2 and 3 form terminal members 11 and 12, to which are connected securing members 13 and 14 forming the end portions of inlet and outlet conduits 15 and 16.

A fluid is caused to flow through the shell tubes 2 and 3, being supplied and discharged through the laterally-extending port members 17 and 18 that respectively communicate with the interiors of shell tubes 2 and 3 near their forward ends. In the heat exchanger of FIGURE 1, member 18 is the inlet and member 17 is the outlet, as indicated by the arrows; however, the direction of flow may be reversed if desired.

In order to provide passages for another fluid to flow in heat exchange relation to the fluid within outer tubes 2 and 3, a group of inner hairpin-shaped tubes 21 is disposed within tubes 2 and 3. Each tube 21 comprises two straight sections 22, preferably having thereon external longitudinal fins 23 and connected by welded return bends 24 in housing 4. The fins 23 increase the rate of heat exchange between the fluid within tubes 21 and the fluid surrounding these tubes within shell tubes 2 and 3; the fins preferably are constructed in accordance with the teachings of prior Patents Nos. 2,261,136 and 2,261,137. In the form of the invention shown in the drawings seven hairpin tubes are employed; a greater or lesser number may be utilized, however. Fluid is supplied to the interiors of the inner tubes 21 through conduits 15 and 16 fixed to securing members 13 and 14; conduit 15 constitutes the inlet while conduit 16 constitutes the outlet, thus providing for counterflow of tube and shell fluids in the illustrated heat exchanger. Obviously, the flows can be reversed if desired. It is also evident that pipes 15 and 16 and port members 17 and 18 can be arranged to connect several of such heat exchanger units in series or in multiple.

In order to make the heat exchanger operative, fluid-tight connections must be provided between the conduits 15 and 16 and the interiors of the inner tubes 21 to provide sealed passages through which the tube fluid can flow, and between the exteriors of the tubes 21 and the interiors of the outer tubes 2 and 3 to provide another passage for shell fluid that must be kept separate from the tube fluid. Furthermore, the hairpin-shaped group of inner tubes 21 should be capable of insertion into or withdrawal from shell tubes 2 and 3 through the rear of the heat exchanger for assembly, inspection or repair. It is also most desirable that these connections be accessible for installation, inspection and cleaning purposes from the front of the heat exchanger.

In order to make the above connections at the front of the heat exchanger and satisfy these and other requirements indicated, a union is provided at the front end of each of shell tubes 2 and 3. Since the unions at the ends of shell tubes 2 and 3 are identical, only the connection or union at the front of the upper shell tube 2 will be described in detail in connection with FIGURES 1, 3 and 4.

The union comprises an inner tube sheet fitting member 26 having an outer periphery of circular cross section. Fitting member 26 includes a radial tube sheet portion having openings 27 into which outer ends of inner tubes 21 are secured in fluid-tight relation. Between the front and inner ends or faces 28 and 29 of member 26, but nearer its inner end, there is an exterior annular groove 31 having an inwardly-facing shoulder 32. The portion of the periphery of member 26 from groove 31 to outer face 28 constitutes a smoothly finished sealing surface 33, which preferably is cylindrical as shown.

The shell tube terminal member 11 has a circular opening 34 surrounding fitting member 26 and communicating with the interior of shell tube 2; the forward part of this opening, that terminates in the front face 35 of the terminal member, is flared outwardly to form a smooth circular cross-sectional sealing surface 36, being in the illustrated embodiment a frusto-conical surface. This sealing surface is immediately adjacent a recess or counterbore 37 terminating in an outwardly-facing shoulder 38 which is disposed axially inward from front end or face 35 of the terminal member and from the shoulder 32 of member 26. Sealing surface 36 on the inner periphery of terminal member 11 is radially spaced outward from and opposite the inner portion of sealing surface 33 of the fitting member. Preferably, as indicated, there is an inwardly projecting ridge 39 on the inner periphery of the terminal member axially inward of its shoulder 38, which is adapted to be closely adjacent a projecting external ridge 41 on the fitting member 26 to locate the fitting member radially relative to the terminal member and to its sealing surface 36.

In order to retain the fitting member 26 in its correct axial position and to prevent it from being moved inwardly or rearwardly into the outer tube 2 as a result of any inwardly directed force on member 26, a split locking ring 42 is mounted in groove 31 on member 26, between inwardly-facing shoulder 32 of the groove and the outwardly-facing shoulder 38 in recess 37 of terminal member 11. When the front of the heat exchanger is open, the locking ring 42 may be readily released by moving the hairpin tubes 21 and fitting member 26 outwardly a distance sufficient to bring the locking ring beyond the outer face 35 of the terminal member 11, from which position the ring can be removed. The maximum external diameter of fitting member 26 is less than the smallest internal diameter of terminal member 11 and shell tube 2; consequently, after removal of locking ring 42 the fitting member 26 can be moved rearwardly entirely through the terminal member and the shell tube 2, if the rear cover 5 of the heat exchanger is not in place.

The securing member 13 has a passageway 43, small at its inner portion to communicate with the interior of supply pipe 15, and large enough at its front face 44 to clear the outer edges of the inner tubes 21, so the passageway can distribute fluid from the interior of pipe 15 to the interior of each of the several inner tubes 21. The portion of the central passageway 43 adjacent front face or end 44 of securing member 13 is flared outwardly to form a smooth circular cross-sectioned sealing surface 45, preferably of frusto-conical shape as shown. This sealing surface is spaced radially outwardly from and extends over the outer portion of the sealing surface 33 on the exterior periphery of fitting member 26, as shown.

A sealing ring 46 is positioned so it contacts all three sealing surfaces 33, 36 and 45, respectively, of the fitting member 26, terminal member 11 and securing member 13. In the illustrated embodiment, this sealing ring has a cylindrical inner sealing surface 47 that engages the sealing surface 33 on the fitting member 26 and two oppositely extending tapered or frusto-conical surfaces 48 and 49 which respectively closely fit the sealing surfaces 36 and 45 of the terminal member and the securing member. Sealing surface 47 of sealing ring 46 preferably has a central circumferential groove 51 that communicates with radial holes 52 opening to the outer surface of sealing ring 47 between confronting faces 35 and 44 of terminal member 11 and securing member 13 to permit any leaked fluid to pass to the atmosphere without intermingling with the other fluid. Preferably for high temperature, high pressure use, sealing ring 46 is formed of a deformable but compression-resistant material such as soft iron which will conform closely to such sealing surfaces to form tight joints, but may be formed of other materials suitable for the service conditions.

Securing member 13 is secured to and drawn toward terminal member 11 by studs 53 threaded into terminal member 13 and passing through openings 54 of flange 55 of member 13, and by nuts 56 threaded on these studs.

In operation, the axially directed forces exerted by nuts 56 on flange 55 of the securing member to urge it toward the terminal member 11, together with the flared conformations of sealing surfaces 36 and 45 of the terminal and securing members engaging corresponding sealing surfaces 48 and 49 of sealing ring 46, causes wedging actions to be exerted on the sealing ring which force the sealing ring into tight sealing engagement with sealing surfaces 36 and 45 on the terminal and securing members and the sealing surface 33 on the outer periphery of the fitting member. If, as is preferable, the sealing ring is formed of a material which can deform under compression, while resisting compression, such as soft iron, the sealing member can deform as required so as to provide fluid-tight seals at the various sealing surfaces.

The forces urging the securing and terminal members toward each other also tend to urge the fitting member 26, through sealing ring 46, to the inward limit of the travel of member 26, where it is located by the locking ring 42 bearing against shoulder 32 on the fitting member and shoulder 38 in the terminal member.

Sealing ring 46 is exposed to the pressure of the tube fluid passing through the inner tubes 21, at the edge of the sealing ring nearest the front face of the fitting member; the sealing ring is exposed to the pressure of the shell fluid passing outside of the inner tubes 21 at the edge of the sealing ring nearest the inner face of the tube sheet member. Usually, the pressure of the tube fluid is substantially greater than the pressure of the shell fluid, so the force resulting from such pressure differential, acting on the front face of the fitting member 26, also tends to urge member 26 inwardly to the innermost limit of its travel as determined by the lock ring 46. The parts are preferably so proportioned that even though the sealing ring is under compression and in sealing engagement, the edge of sealing ring 46 nearest the locking ring 42 is spaced from the locking ring, so that the locking ring can perform its locating function and the sealing ring can perform its sealing function independently of each other and without interference.

The fluids within the exchanger will not intermingle even in the event of joint leakage. If the tube fluid should escape past the sealing ring 46 between the juncture of the sealing ring and the securing member, the fluid would escape to atmosphere between the securing and terminal members; if, on the other hand, the tube fluid should seep between the fitting member and the sealing ring, it would escape into the groove 51 of the sealing ring and from thence through openings 52 to the atmosphere. If the shell fluid should leak between the terminal member and the sealing ring, such leakage would escape to the atmosphere; if, on the other hand, the shell fluid should leak between the sealing ring and the fitting member, such fluid would escape into the groove 51 and through openings 52 into the atmosphere. Any tube or shell fluid that might leak between the sealing ring and the fitting member necessarily would pass to the atmosphere through the paths indicated since the atmospheric pressure is lower than either the tube fluid pressure or the shell fluid pressure.

The above described heat exchanger can be disassembled readily by merely removing the securing members 13 and 14 at the front of the exchanger and the cover 5 of the housing 4 at the rear of the exchanger, sliding the hairpin tubes 21 forward to permit ready removal of the sealing ring 46 and split locking ring 42 from each fitting member 26 and then withdrawing the tubes 21 and their attached fitting members 26 from the rear of the heat exchanger. In reassembling the heat exchanger, the tubes 21 and their fitting members 26 are inserted into the shell tubes 2 and 3 from the rear, the locking rings 42 and the sealing rings 46 are placed on fitting members 26 while they project forwardly beyond the terminal members, the fitting members and tubes are moved to their innermost positions, and the securing members are bolted on. The sealing surfaces and sealing rings can be cleaned immediately before the union is closed. The tightness of the joints can be readily determined visually, since any leakage will be immediately evident at the exterior of the union.

The union shown in FIGURES 5 and 6 is identical to that described previously, except as follows. There are two abutting sealing rings 46a and 46b, respectively having exterior sealing surfaces 48 and 49 and interior sealing surfaces 47a and 47b. The confronting faces 57a and 57b of the sealing rings abut over a groove 61 in the outer periphery of the fitting member 26, which divides this portion of the outer periphery into two sealing surfaces 33a and 33b, respectively disposed radially inwardly and generally opposite sealing surfaces 36 and 45 of the terminal and securing members 11 and 13. The abutting faces of the sealing rings are grooved at 62 or finished to permit the sealing rings to bear against each other, while permitting any fluid that may leak into groove 61 to escape into the atmosphere. Alternatively, the inner portions of these sealing rings may be shaped to provide a fluid-collecting groove similar to groove 51 of the previous embodiment, and the fitting member may have a single sealing surface 33 as in the previous embodiment.

It should be noted that in each of the constructions illustrated embodying the invention, the securing member is sealed to the fitting member fixed to the ends of the inner tubes, and to the terminal member at the end of the outer shell tube through sealing ring means contacting sealing surfaces of the terminal and securing members and sealing surface zones on the fitting member radially spaced from and generally opposite such sealing surfaces of the terminal and securing members. The securing member, which may be a single unitary massive member to withstand high internal pressures, thus carries on a sealing function by exerting force that aids in providing leak-proof joints for the fluid within the shell but outside the inner tubes and for the fluid inside the inner tubes. Moreover, the securing member aids in locating the fitting and terminal members relatively to each other as well as locating the securing member relatively to the other two members, while itself being aligned radially by the sealing ring means. The sealing ring means also aids in locating the fitting member relatively to the terminal and securing members, and the securing member relatively to the other two members, as well as performing its sealing functions. Furthermore, the design is such that the tighter the nuts 56 are tightened, the greater is the sealing force exerted on the sealing ring means to provide a better seal.

The sealing surfaces of the various members are of simple design and readily accessible for machining. For this reason, as well as because of other features, the parts of the unions of heat exchangers embodying the invention can be manufactured economically by ordinary machining operations and can be easily and economically assembled and disassembled.

The unions can be assembled and disassembled readily in a manner which makes them particularly useful for heat exchangers of the hairpin type. Furthermore, they can be opened up for inspection or cleaning of the sealing surfaces and sealing rings, without disassembling the entire heat exchanger.

The above and other modifications of the invention will be apparent to those skilled in the art. For example, the sealing ring means can be formed of other suitable material than that disclosed, even of rubber-like or plastic materials, depending on the pressure and temperature requirements to which the unions embodying the sealing ring means will be put.

It is to be understood that the patent is not limited to the preferred forms of the invention disclosed herein or in any other manner than by the scope of the appended claims.

We claim:

1. A union for connecting at least three conduits providing a fluid-flow relation between at least two of said conduits, the first of said conduits communicating with at least one second conduit and defining a first passage through which a first fluid is adapted to flow, and the third of said conduits surrounding said second conduit in spaced relation thereto and defining between the exterior periphery of said second conduit and the interior periphery of said third conduit a second passage adapted to contain a second fluid to be kept separate from said first fluid, said union having an axis and comprising a terminal member fixed in fluid-tight relation to said third conduit and having an outer end and an inner periphery, a fitting member fixed in fluid-tight relation to said second conduit and having an outer periphery terminating in a front end and an inner end, a portion of which fitting member adjacent its inner end is disposed within and spaced radially from said inner periphery of said terminal member and a front end portion of which fitting member projects beyond the outer end of said terminal member, means disposed between the inner periphery of said terminal member and the outer periphery of said fitting member to limit relative inward axial movement of said fitting member in said terminal member, a securing member fixed in fluid-tight relation to said first conduit and having an outer end confronting the outer end of said terminal member and an inner periphery surrounding and radially spaced from said projecting portion of said fitting member, a first sealing surface on the inner periphery of said terminal member and generally facing the outer end of said securing member, a second sealing surface on the inner periphery of said securing member and generally facing the outer end of said terminal member, generally axial sealing surface zones on the outer periphery of said fitting member opposite said first and second sealing surfaces, sealing means disposed in contact with all of said sealing surfaces and sealing zones, and means acting between said securing member and said terminal member to exert an axial force thereon that draws said terminal member and said securing member toward each other simultaneously to force said sealing means against all of said sealing surfaces and sealing zones to thereby prevent fluid in said first passage from escaping between said fitting member and said securing member and fluid in said second passage from escaping from between said fitting member and said terminal member when said force-exerting means is activated, and said sealing means, fitting, securing and terminal members all being so constructed and arranged that when said sealing means is in final sealing position against said fitting, securing and terminal members said outer ends of said terminal and securing members are axially spaced apart, and there is recess means between said sealing means and said fitting member that communicates with the exterior of the sealing means in the space between the terminal and securing members to permit fluid leaking from either of said passages to escape to the exterior of said sealing means into said space.

2. The union of claim 1 in which said sealing means is a single sealing ring.

3. The union of claim 1 in which said sealing surfaces and sealing zones are shaped to provide wedging forces on said sealing means and in which said sealing means is formed of deformable compression-resistant material, to cause said sealing means to engage said sealing surfaces and zones in fluid-tight sealing relation.

4. The union of claim 1 in which said sealing zones are part of a third sealing surface on the outer periphery of said fitting member opposite said first and second sealing surfaces, and said sealing means is disposed in contact with said first, second and third sealing surfaces.

5. The union of claim 1 in which there are sealing surfaces on the outer periphery of said fitting member opposite said first and second sealing surfaces of said terminal and securing members, and in which there is sealing means disposed in contact with all of said sealing surfaces, which sealing means is forced against all of said sealing surfaces by said force exerted by said force-exerting means.

6. The union of claim 1 in which said first and second sealing surfaces are annular sealing surfaces, in which said sealing surface zones are annular sealing surface zones, and in which said sealing means is annular sealing means disposed in contact with all of said sealing surfaces and sealing surface zones.

7. The union of claim 1 in which said first and second sealing surfaces are generally frusto-conical annular sealing surfaces, said sealing surface zones are generally cylindrical annular zones, and said sealing means contacting all of said surfaces and zones is annular sealing means.

8. The union of claim 1 in which said recess means comprises a first recess defined between said sealing means and said fitting member and located between said sealing surface zones on said fitting member that are contacted by said sealing means and in which there is another recess extending between said first recess and the exterior of said sealing means into the space between said terminal member and said securing member.

9. The union of claim 8 in which said first recess is an annular recess.

10. The union of claim 1 in which said sealing means comprises a first sealing ring between said first sealing surface and one of said sealing zones and a second sealing ring between said second sealing surface and the other of said zones, said sealing rings being in abutting relation.

11. The union of claim 10 in which there is a first recess between said fitting member and said first and second sealing rings adjacent their abutting portions, and in which there is another recess extending between said first recess and the exterior of said sealing rings into the space between said terminal member and said securing member.

References Cited

UNITED STATES PATENTS

| | | |
|---|---|---|
| 3,325,190 | 6/1967 | Eckert et al. _____ 285—18 |
| 333,412 | 12/1885 | Hoeveler _____ 285—13 |
| 883,075 | 3/1908 | Anderson _____ 285—334.2 X |
| 2,422,009 | 6/1947 | Goetze. |
| 2,520,755 | 8/1950 | Brown _____ 285—137 X |
| 3,074,480 | 1/1963 | Brown et al. _____ 285—137 X |
| 3,155,404 | 11/1964 | Brown et al. _____ 285—137 |

CARL W. TOMLIN, *Primary Examiner.*

D. W. AROLA, *Assistant Examiner.*